Figure 1:
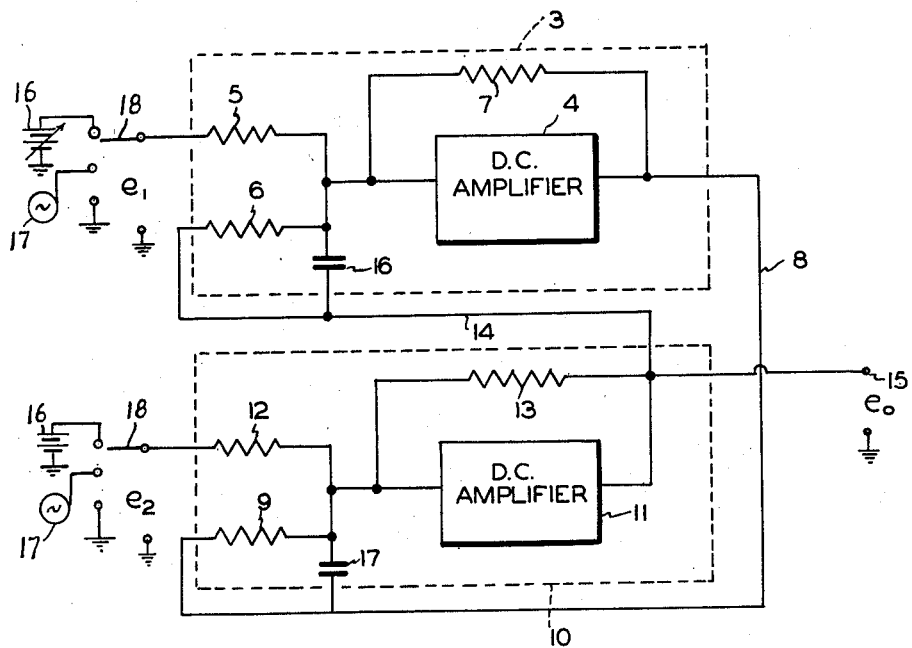

Jan. 7, 1958     H. B. O. DAVIS     2,819,397

VOLTAGE COMPARATOR

Filed June 17, 1955

INVENTOR
HENRY B. O. DAVIS

BY     B. L. Zangwill
ATTORNEY

United States Patent Office 2,819,397
Patented Jan. 7, 1958

2,819,397

VOLTAGE COMPARATOR

Henry B. O. Davis, Kensington, Md.

Application June 17, 1955, Serial No. 516,341

12 Claims. (Cl. 250—27)

(Granted under Title 35, U. S. Code (1952), sec. 266)

The invention described herein may be manufactured and used by or for the Government of the United States of America for governmental purposes without the payment of any royalties thereon or therefor.

This invention relates to a device for comparing two A. C. or D. C., or combined A. C. and D. C. voltage levels; and more particularly to a voltage comparator which develops a constant high voltage output having two stable states; and more specifically to a voltage comparator whose output voltage is wholly independent of the difference in input voltage levels.

Heretofore methods of voltage comparison involved the detection of the point of conduction of a diode or the firing point of a gas tube. Neither of these methods satisfied the requirements of simplicity, stability or precision unless the voltages involved were of large magnitude. Other prior methods provided an output proportional to the difference in amplitude of the two input signals. In these the output voltage was small when the difference between the input voltages was small. Hence the application of these devices was limited in use to operating a meter or differential relay but were not adapted to operate high speed electronic switches when the difference was small or the variations in amplitude were slow.

The instant invention obviates the disadvantages of the prior art and involves the use of two operational amplifiers for comparing two voltage sources. Each of said amplifiers has an input circuit and an output circuit, the output circuits of each being connected to the input of the other such that if one of the input voltages is greater than the other a regenerative action takes place and saturation of the operational amplifiers occurs in a sense determined by which of the two input voltages is greater. When the other of the two input voltages becomes greater than said hereinbefore mentioned greater voltage the output becomes saturated in the opposite sense and the switch from one state of saturation to another, e. g. positive to negative saturation, occurs substantially instantaneous thereby producing a step wave. A steady D. C. and an alternating input or two alternating waveshapes of different phase may be used for the inputs to produce an alternating square wave output, the change of state occuring at a point where the A. C. crosses the D. C. or the two alternating voltages are substantially equal. Hence, it can be seen that by properly controlling the phase and/or frequency of the inputs with respect to one another i. e. the points where they are equal or varying in opposite direction, a square wave output of constant amplitude and variable frequency may be obtained.

An object of the invention is to provide a simple method of determining when two voltages are of substantially equal amplitude or zero.

Another object of the invention is the provision of a method for determining when a function is reduced to zero or ground potential.

An object of the invention is the provision of an automatic voltage comparator.

Another object of the invention is to provide a device which develops a triggering pulse for a high speed electronic switch when one voltage equals another voltage, exceeds a given voltage level, or decreases to a given level.

Another object of the invention is the provision of a voltage comparator for developing a constant high amplitude step function which is independent of the absolute magnitude of the differences in the amplitudes of the voltages compared.

Another object is the provision of a voltage comparator which can compare either A. C. or D. C. voltages, or combinations thereof.

A further object is the provision of a device adapted to operate as a constant amplitude variable frequency square wave generator.

Figure 2:
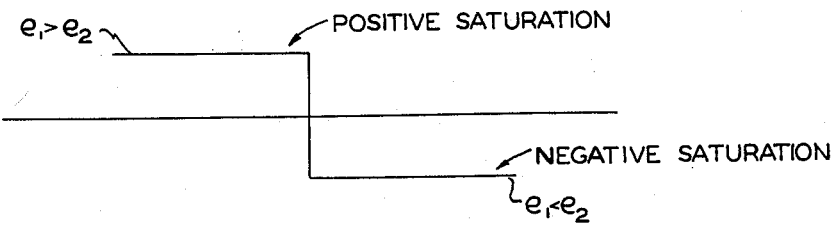

Other objects and many of the attendant advantages of this invention will be readily appreciated as the same becomes better understood by reference to the following detailed description when considered in connection with the accompanying drawings wherein:

Fig. 1 is a partly schematic block diagram of the overall arrangement of the voltage comparator; and Fig. 2 is an illustration of the output waveform.

Referring now to the drawings, wherein like reference characters designate like or corresponding parts throughout the several views, there is shown in Fig. 1 at 3 an operational amplifier, well known to the art which develops an output which is a summation of the inputs thereto. The theory of such operational amplifiers may be found in an article entitled "Driftless D. C. amplifiers," by Frank R. Bradley et al. in the April 1952 issue of Electronics and in application Serial No. 506,100, filed May 4, 1955, wherein is shown a preferred embodiment.

Such an operational amplifier is shown comprising a high gain D. C. amplifier 4, input resistors 5 and 6 and a negative feedback resistor 7. The overall gain of the operational amplifier may be any desired value though in the specific embodiment shown an overall gain of one was found satisfactory. The operational amplifier 3 was initially balanced to zero voltage output with no input voltage. The output of operational amplifier 3 is connected by a conductor 8 to an input resistor 9 of a second operational amplifier generally designated by 10 and similar in all respects to amplifier 3. The amplifier 10 comprises a high gain D. C. amplifier 11 having input resistors 9 and 12 and a negative feedback resistor 13. The output of operational amplifier 10 is connected by a conductor 14 to input resistor 6 of operational amplifier 3 and to output terminals 15. Condensers 16 and 17 shunting input resistor 6 of amplifier 3 and resistor 9 of amplifier 10 respectively, are utilized to improve the switching speed by improving the frequency response of the amplifiers.

To understand the operation of the circuit of Fig. 1, it will be assumed that the input $e_1$ is +2 volts and it is desired to determine the instant at which input $e_2$ is equal in amplitude to $e_1$. Assume that $e_2$ is initially zero, the 2 volt input $e_1$ will cause an output of −2 volts after amplification in operational amplifier 3. This −2 volt output is fed to the input of operational amplifier 10 through resistor 9 causing an output therefrom of +2 volts. This +2 volts output is fed to operational amplifier 3 through input resistor 6 where it is added to the voltage input $e_1$ (2 volts) causing an output of −4 volts which is fed to amplifier 10 and again back to amplifier 3. The action can be seen to be regenerative and continues until saturation of the operational amplifiers is reached. In the preferred embodiment, saturation of the amplifiers was reached at 90 volts. This saturation condition is reached substantially instantaneously.

The output of amplifier 10 at terminal 15 is a positive quantity whose value is the saturation voltage of the amplifier. This condition of saturation will continue for as long as $e_1$ is greater than $e_2$.

If now a voltage $e_2$ of increasing amplitude is applied to amplifier 10 through resistor 12, when its value exceeds $e_1$ a finite amount, then the voltage $e_2$ will become predominant and a regenerative action as explained above will occur with amplifier 10 going to negative saturation. Again this condition of negative saturation will continue for as long as $e_2$ is greater than $e_1$. From Fig. 2, it can be seen that as soon as the point of exact equality of the input voltages $e_1$ and $e_2$ is exceeded by a finite amount, the amplifier instantaneously shifts from a positive saturated condition to a negatively saturated condition through zero. The shift always appearing at the same points for increasing or decreasing voltages. This high voltage step function, 180 volts in the preferred embodiment, can be used to trigger a high speed electronic switch. It is to be noted that this high output voltage step function is independent of the difference in input voltages and independent of the speed of variations in amplitude of the inputs. Further, the balance of the amplifiers may be adjusted to cause the step function to lead or lag the point of exact equality by any desired amount. Thus, a voltage comparator capable of comparing a wide range of voltages ($\pm$ 90 volts input in specific embodiment) having frequencies down to zero is provided.

Another possible application of the novel circuit is as a square wave generator. By applying from suitable sources, such as D. C. sources 16 and alternating sources 17 which may be connected selectively to the input terminals as by switches 18 for example, a steady D. C. on one and an alternating voltage on the other input or two continuous alternating voltages to the inputs of amplifiers 3 and 10 displaced in phase with respect to each other or of different frequencies, an alternating square wave may be obtained at the output whose frequency would be related to the number of times the alternating voltage intersected the D. C. voltage or to the phase or frequency of the two alternating input voltages.

Another application is to ground one of the inputs through selectively operated switches 18 and thereby use the circuit as a ground level detector.

Obviously many modifications and variations of the present invention are possible in the light of the above teachings. It is therefore to be understood that within the scope of the appended claims the invention may be practiced otherwise than as specifically described.

What is claimed is:

1. A device for generating a step function adapted for triggering a high speed electronic switch when two voltages, at least one of which is variable, pass through equality comprising a pair of summing operational amplifiers each having an input circuit to which said voltages are respectively applied simultaneously, a regenerative circuit connecting said amplifiers together whereby each sums the voltage applied thereto with the sum of its own output and the voltage applied to the other amplifier, said regenerative circuit causing said summation to occur whereby instantaneous saturation of the amplifiers is effected in a sense determined by which of said voltages is greater and for as long as one of said voltages exceeds the other, said regenerative circuit causing said saturation of the amplifiers to instantaneously reverse when said other voltage passes through equality and exceeds said one voltage by a finite amount to thereby produce a step function of constant amplitude, and means for connecting the output of one of said amplifiers to a utilization circuit.

2. A device for comparing two relatively varying voltages to determine when they are of equal magnitude comprising a first operational amplifier, a second operational amplifier, means connecting the output of said first amplifier to the input of said second amplifier and the output of said second amplifier to the input of the first amplifier, means applying one of said voltages to the first amplifier, means applying the other of said voltages to the second amplifier, said means connecting said amplifiers causing an instantaneous regenerative action in both amplifiers whereby said amplifiers are saturated, said saturation being in one sense as long as the voltage applied to the first amplifier exceeds or equals that applied to the second amplifier and instantaneously reversing to the opposite sense when the voltage applied to the second amplifier exceeds that applied to the first amplifier by a finite amount, and means connected to the output of one of said amplifiers to derive a step function indicative of the equality of said voltages.

3. A device as set out in claim 2 wherein said operational amplifiers comprise a high gain direct current amplifier, a feedback resistor and two input resistors connected to the input junction of said direct current amplifier whereby the output is the sum of the voltages applied to said input resistors.

4. A device as set out in claim 2 wherein said voltages are direct current voltages of varying magnitude.

5. A device as set out in claim 2 wherein said voltages are alternating current voltages.

6. A voltage comparator for comparing the magnitudes of two relatively varying voltage comprising, a first operational amplifier having a first and second input resistor, a second operational amplifier having a first and second input resistor, one each of said voltages connected to said first input resistors respectively, means connecting the output of said first operational amplifier to said second input resistor of said second operational amplifier, means connecting the output of said second operational amplifier to said second input resistor of said first amplifier, and an output circuit connected to one of said amplifiers for developing a step function having two stable states, the transition between one stable state to the other corresponding to the point of equality of the magnitudes of said compared voltages.

7. A square-wave generator comprising a pair of operational amplifiers each having two input resistors adapted to add signals applied thereto, two voltage sources simultaneously, means connecting one each of said voltage sources to one each of said input resistors associated with said amplifiers, means connecting the outputs of said amplifiers to the other input resistor of the other amplifier whereby regeneration takes place saturating said amplifiers in a sense determined by which of the magnitudes of said sources is greater and in the opposite sense when the magnitudes of said sources are reversed to thereby produce a square wave output of constant amplitude.

8. A device for generating square waves comprising a first means for electronically adding two voltages, a second means for electronically adding two voltages, a voltage source for each one of said means for adding, means connecting the output of the first named means to the input of said second named means whereby the output of the first named means is added to the voltage applied to the second named means, means connecting the output of said second named means to the input of said first named means whereby the output of said second named means is added to the voltage applied to said first named means, said connecting means causing an instantaneous regenerative action in said means for adding whereby saturation in said means for adding occurs in a sense determined by which of said voltage sources is initially greater and in the opposite sense when said voltages are reversed by a finite amount, the change in the sense of saturation occurring at substantially the same points for relatively increasing or decreasing voltages, and means connected to the output of one of said means for adding for developing a square wave output.

9. A device as set out in claim 7 wherein said voltage sources are a steady direct current and an alternating current voltage respectively.

10. A device as set out in claim 7 wherein said voltages sources are both direct current voltages of predetermined phase.

11. A ground level detector for determining when a voltage varies through ground comprising a first operational amplifier, a second operational amplifier, two parallel impedances serially connected to the inputs of each of said amplifiers, means for applying said voltage to said first amplifier through one of said input impedances, means for connecting the output of said first amplifier through one of said input impedances in said second amplifier, means grounding the other input impedance of said second amplifier, means for connecting the output of said second amplifier through the other input impedance of said first amplifier, said connecting means causing said amplifiers to saturate in one sense when said voltage is above ground and in the other sense when said voltage passes through and below ground, the transition between positive and negative saturation being instantaneous whereby a step wave is produced when said voltage passes through ground, and means connected to the output of one of said amplifiers for feeding said step wave to a utilization circuit.

12. A voltage comparator for comparing the magnitude of two varying voltages comprising, a first and a second summing operational amplifier, means for applying said varying voltages simultaneously to the inputs of said first and second operational amplifiers respectively, means regeneratively connecting the output of said first to the input of said second amplifier and the output of said second to the input of said first amplifier, and means connected to the output of one of said amplifiers to derive a constant high amplitude step function indicative of the point of equality of said varying voltages.

References Cited in the file of this patent

UNITED STATES PATENTS

| | | |
|---|---|---|
| 1,844,950 | Finch | Feb. 16, 1932 |
| 1,979,484 | Mathes | Nov. 6, 1934 |
| 2,401,779 | Swartzel | June 11, 1946 |
| 2,583,587 | Milsom | Jan. 29, 1952 |
| 2,682,638 | Enabnit | June 29, 1954 |